US010205507B2

(12) United States Patent
Madaiah (10) Patent No.: US 10,205,507 B2
(45) Date of Patent: Feb. 12, 2019

(54) RELAY ARCHITECTURE, RELAY NODE, AND RELAY METHOD THEREOF

(71) Applicant: Tejas Networks, Ltd., Bangalore (IN)

(72) Inventor: Vinod Kumar Madaiah, Bangalore (IN)

(73) Assignee: Tejas Networks, Ltd., Bangalore (IN)

( * ) Notice: Subject to any disclaimer, the term of this patent is extended or adjusted under 35 U.S.C. 154(b) by 104 days.

(21) Appl. No.: 15/248,432

(22) Filed: Aug. 26, 2016

(65) Prior Publication Data

US 2017/0064750 A1    Mar. 2, 2017

(30) Foreign Application Priority Data

Aug. 28, 2015   (IN) ............................ 4524/CHE/2015

(51) Int. Cl.
    *H04W 76/12*      (2018.01)
    *H04B 7/155*      (2006.01)
    *H04W 88/04*      (2009.01)

(52) U.S. Cl.
    CPC ........ *H04B 7/15528* (2013.01); *H04W 76/12* (2018.02); *H04W 88/04* (2013.01)

(58) Field of Classification Search
    CPC ..... H04W 8/26; H04W 76/02; H04W 76/022; H04W 76/04; H04W 88/04; H04B 7/15528
    See application file for complete search history.

(56) References Cited

U.S. PATENT DOCUMENTS

| | | | | |
|---|---|---|---|---|
| 8,335,490 | B2* | 12/2012 | Kaippallimalil | H04L 63/08 380/278 |
| 8,442,049 | B2* | 5/2013 | Liu | H04B 7/15557 370/392 |
| 8,638,749 | B2* | 1/2014 | Cherian | H04W 36/0016 370/331 |
| 8,718,647 | B2* | 5/2014 | Maheshwari | H04L 1/1822 370/331 |
| 8,724,470 | B2* | 5/2014 | Yi | H04L 47/14 370/235 |

(Continued)

FOREIGN PATENT DOCUMENTS

| | | | | |
|---|---|---|---|---|
| EP | 2443804 A1 * | 4/2012 | ............ | H04W 28/06 |
| EP | 2443804 A4 * | 8/2014 | ............ | H04W 28/06 |

(Continued)

*Primary Examiner* — Eric Nowlin
(74) *Attorney, Agent, or Firm* — Banner & Witcoff, Ltd.

(57) ABSTRACT

In an aspect, the present disclosure relates to a relay node (RN) operatively coupled with user equipment (UE), wherein the RN is configured to create one or more tunnels to enable transmission of data messages and control messages from the UE directly to a packet data network gateway (PGW). The present disclosure relates to methods and systems for tunneling user equipment (UE) traffic by creating one or more tunnels between a relay node (RN) and packet data network gateway (PGW) to prioritize control messages over data messages, wherein the one or more tunnels are created when the UE gets attached to the relay node (RN). Further, tunneling of the one or more control/non-access stratum (NAS) messages to the PGW can be performed over one of the higher priority tunnels such that when the NAS messages are received at the PGW or HGW, they can be forwarded to a mobility management entity (MME).

20 Claims, 8 Drawing Sheets

(56) References Cited

U.S. PATENT DOCUMENTS

| | | | | |
|---|---|---|---|---|
| 8,792,408 B2 * | 7/2014 | Racz | H04W 28/06 | 370/315 |
| 8,886,714 B2 * | 11/2014 | Brand | H04L 67/10 | 709/203 |
| 8,923,816 B2 * | 12/2014 | Lee | H04W 12/06 | 455/411 |
| 9,113,455 B2 * | 8/2015 | Chen | H04W 4/60 | |
| 9,119,184 B2 * | 8/2015 | Madaiah | H04W 72/04 | |
| 9,445,215 B2 * | 9/2016 | Diachina | H04W 4/70 | |
| 9,672,527 B2 * | 6/2017 | M | H04W 76/022 | |
| 9,882,803 B2 * | 1/2018 | Xie | H04L 45/04 | |
| 2009/0016300 A1 * | 1/2009 | Ahmavaara | H04W 36/0072 | 370/331 |
| 2009/0303966 A1 * | 12/2009 | Cherian | H04W 36/0016 | 370/331 |
| 2009/0318152 A1 * | 12/2009 | Maheshwari | H04L 1/1822 | 455/436 |
| 2010/0322148 A1 * | 12/2010 | Liu | H04B 7/15557 | 370/315 |
| 2010/0322151 A1 * | 12/2010 | Racz | H04W 28/06 | 370/328 |
| 2011/0264740 A1 * | 10/2011 | Diachina | H04W 4/70 | 709/204 |
| 2012/0093125 A1 * | 4/2012 | Hapsari | H04W 36/0016 | 370/331 |
| 2012/0106435 A1 * | 5/2012 | Hapsari | H04W 36/0016 | 370/315 |
| 2012/0182929 A1 * | 7/2012 | Chen | H04L 63/1458 | 370/315 |
| 2012/0224536 A1 * | 9/2012 | Hahn | H04L 45/00 | 370/328 |
| 2013/0016649 A1 * | 1/2013 | Damnjanovic | H04W 88/04 | 370/315 |
| 2013/0029639 A1 * | 1/2013 | Lee | H04W 12/06 | 455/411 |
| 2013/0041931 A1 * | 2/2013 | Brand | H04L 67/10 | 709/203 |
| 2013/0258943 A1 * | 10/2013 | Madaiah | H04W 72/04 | 370/315 |
| 2013/0260774 A1 * | 10/2013 | Madaiah | H04W 72/04 | 455/450 |
| 2013/0279510 A1 * | 10/2013 | Madaiah | H04L 12/4658 | 370/395.53 |
| 2013/0336198 A1 * | 12/2013 | Kim | H04L 5/001 | 370/315 |
| 2013/0343179 A1 * | 12/2013 | Madaiah | H04L 12/437 | 370/222 |
| 2014/0003329 A1 * | 1/2014 | Chen | H04W 4/60 | 370/315 |
| 2014/0334418 A1 * | 11/2014 | Urie | H04W 40/02 | 370/329 |
| 2015/0010010 A1 * | 1/2015 | Xie | H04L 45/04 | 370/401 |
| 2015/0071169 A1 * | 3/2015 | Wang | H04W 76/022 | 370/328 |
| 2017/0026824 A1 * | 1/2017 | Kim | H04W 8/08 | |
| 2017/0150363 A1 * | 5/2017 | Tenny | H04L 63/18 | |
| 2017/0150420 A1 * | 5/2017 | Olsson | H04W 40/248 | |
| 2017/0302360 A1 * | 10/2017 | Aminaka | H04W 80/02 | |
| 2017/0373883 A1 * | 12/2017 | Guo | H04L 12/4633 | |
| 2018/0167983 A1 * | 6/2018 | Salkintzis | H04W 8/22 | |

FOREIGN PATENT DOCUMENTS

| | | | | |
|---|---|---|---|---|
| EP | 3065498 A1 * | 9/2016 | | H04W 76/022 |
| EP | 2443804 B1 * | 2/2017 | | H04W 28/06 |
| EP | 3065498 B1 * | 11/2017 | | |
| WO | WO-2010147528 A1 * | 12/2010 | | H04W 28/06 |
| WO | WO-2011160495 A1 * | 12/2011 | | H04W 28/06 |

* cited by examiner

RELAY ARCHITECTURE, RELAY NODE, AND RELAY METHOD THEREOF

TECHNICAL FIELD

The present disclosure relates to the field of radio access network. More particularly, the present disclosure aims to describe a relay architecture, a relay node, and a relay method thereof for enabling ultra-low cost radio access network.

BACKGROUND

The background description includes information that may be useful in understanding the present invention. It is not an admission that any of the information provided herein is prior art or relevant to the presently claimed invention, or that any publication specifically or implicitly referenced is prior art.

In a typical wireless network, when distance between two devices such as mobile phones is more than transmission/reception range, intermediate nodes are required to provide communication services between the devices. Such intermediate nodes are generally referred to as relay nodes that are used to send information between two devices. Relevance of a relay node and relay architecture in today's radio access networks such as 4G long term evolution (LTE) and next generation radio access network (5G) has increased as network operators try to achieve enhanced coverage and capacity.

Different technologies such as multiple input multiple output (MIMO), orthogonal frequency-division multiplexing (OFDM) and other advanced error correction techniques are being used by wireless networks to improve throughput under many conditions, however these technologies do not fully mitigate the problems experienced at a cell edge. As cell edge performance is becoming more critical, it is necessary to enhance performance of the cell edge at comparatively low cost. Cell edge performance depends on relay node performance.

A typical LTE network includes a plurality of base transceiver stations (BTS), also referred to as eNodeBs, a plurality of user equipments (UE) that connect to one or more eNodeBs for accessing voice or data service, a plurality of relay nodes (RN), also referred to as relays, and a plurality of repeaters. Network elements of system architecture evolution (SAE) include mobility management entity (MME), serving gateway (SGW), and packet data network Gateway (PDN-GW). In LTE network, eNodeB is generally responsible for complete radio resource management and allows a UE to access any network service. Multiple eNodeBs connect to evolved packet core (EPC) using MME for control plane signaling and also connect to SGW for user plane data transfer. SGW in a network is generally connected to a packet data network gateway (PDN-GW or PGW) for providing connectivity to external networks, including the public Internet. There are various types of eNodeBs available such as Macro/Wide-area, Micro/local-area, Pico/Small-area, Femto/home, which can respectively be called as Macro BTS, Micro BTS, PiCo BTS and Femto BTS.

In a network, repeaters or relay nodes are used generally to extend coverage of an existing BTS. They re-transmit uplink and downlink signals without decoding any of the content. First antenna of a repeater can be directed towards donor cell while second antenna can be directed towards target coverage area. As the target coverage area could be an indoor location, it may be required that one of the antenna to be an indoor antenna. Some functionalities of repeaters and relay nodes are same, however some of the functionalities are different. For example, a relay node can have its own cells and protocol stack, and also relies upon a radio frequency (RF) connection to a donor cell. The relay is similar to a normal BTS but without a fixed or wired transport connection, and can decode signals to make radio resource management decisions. PGW connects to a packet data network, which could be an external network (either public or private) or belong to the operator. The network architecture may also contain other network elements such as home subscriber server (HSS), equipment identity register (EIR), and policy and charging rules function (PCRF) etc. and different interfaces connecting all the network elements, according to 3GPP specifications.

Figure 1:
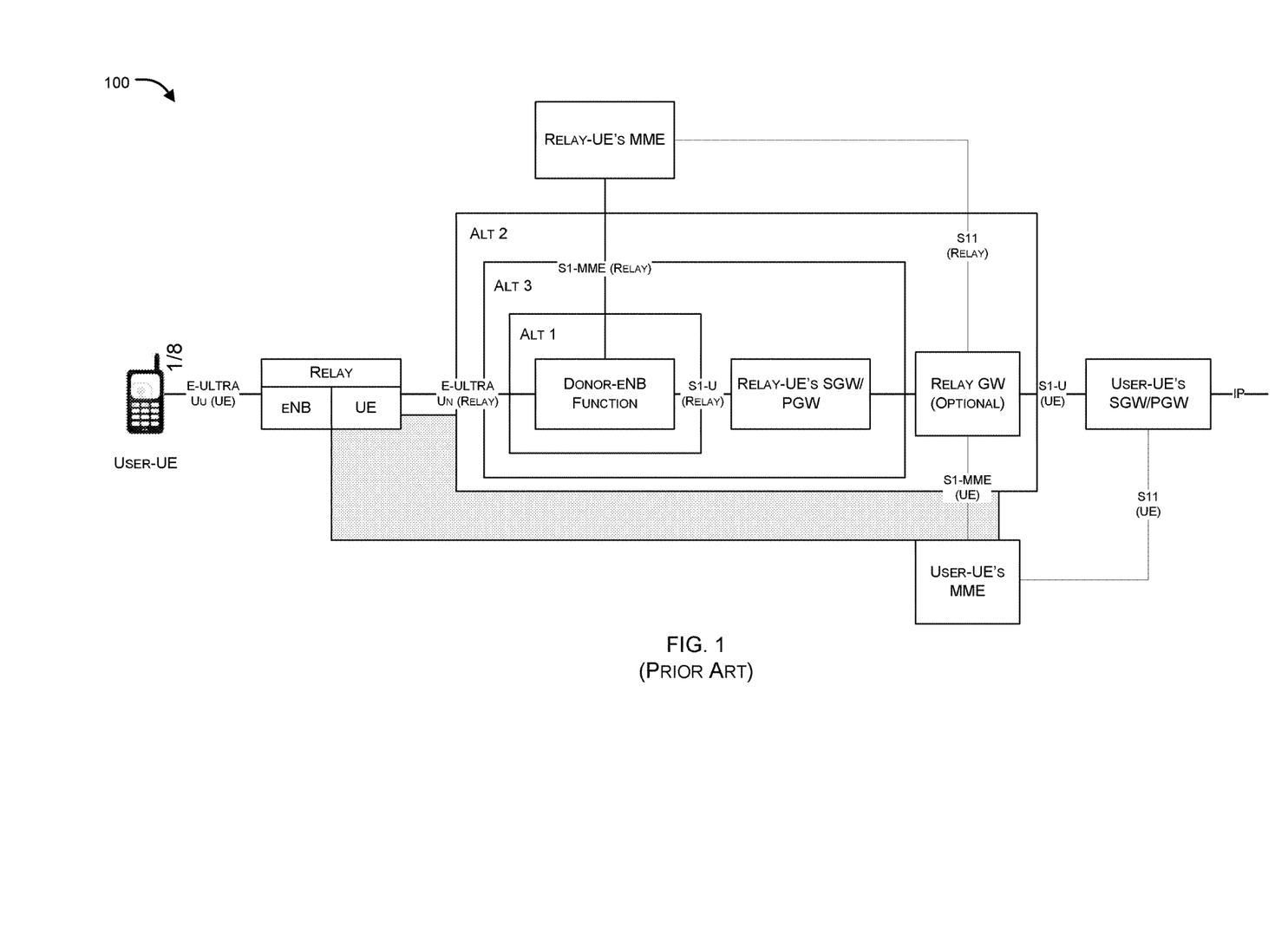
FIG. 1 illustrates an existing relay architecture variant.

There are different relay architectures, relay nodes, and methods thereof for relay management that are known in the prior art. FIG. 1 illustrates an existing relay architecture variant. One type of classification is the relay architecture where the relays are classified as architecture A and other type of classification is where the relays are classified as architecture B. Each of these architecture, as shown in FIG. 1, have different variants such as architecture A has three below known variants:
Alt 1: Full-L3 relay
Alt 2: Proxy S1/X2-Home eNodeB GW function at eNodeB
Alt 3: RN bearer terminates in DeNodeB.

Similarly architecture B has different variants, for example Alt 4: S1 UP terminated in donor eNodeB (DeNB). Further, relay nodes may also be classified depending on layers such as layer 1, layer 2, and layer 3 relay nodes.

In another classification, relay nodes can be classified as Type 1 and Type 2 relay nodes, wherein Type 1 LTE relay nodes control their cells with their own identity including the transmission of their own synchronization channels and reference symbols. Type 1 relays appear as if they are a Release 8 eNB to Release 8 UEs and ensures backward compatibility. The basic Type 1 LTE relay provides half duplex with in-band transmissions. Type 1 LTE can further be classified as Type 1.aLTE relay nodes (RNs) that are outband RNs that have same properties as the basic Type 1 relay nodes but can transmit and receive at the same time i.e. full duplex. Type 1.bLTE relay nodes are inbandRNs that have an ample or adequate isolation between antennas used for BS-RN and RN-UE (UE attached to RN), which isolation can be achieved by adjusting antenna spacing, directivity along with specialized digital signal processing techniques, which in turn impacts cost. Performance of these RNs and fem to cells can be similar.

Type 2 LTE relay nodes do not have their own cell identity and look just like main cell. Any UE in range cannot make distinction between a relay node from the main eNB within the cell. Control information can be transmitted from the eNB and user data from the LTE relay.

| LTE Relay Class | Cell ID | Duplex Format |
| --- | --- | --- |
| Type 1 | Yes | Inbandhalf duplex |
| Type 1.a | Yes | Outband full duplex |
| Type 1.b | Yes | Inband full duplex |
| Type 2 | No | Inband full duplex |

One of the known problems with these relay nodes is that these relay nodes are not transparent to eNodeB and add extra cost. Another problem with existing relay nodes is that the eNodeB must support RN protocol stack for transfer of user plane data and perform signaling. Yet another problem with existing relay nodes is of modified air-interface, called as "Un" interface to user and control plane. The existing relay network poses some of the problems as highlighted in the 3GPP specification such as radio resource configuration between RN and eNB which adds extra cost, RN subframe configuration information element adds extra cost and also a new relay specific scheduler is required. The existing relay node of any architecture and type specified in 3GPP requires enhancements to eNodeB (eNB) and evolved packet core (EPC) elements.

There is therefore a need in the art for a system and method for building a new relay node that does not require any change to eNodeB, protocol stack, UE and EPC elements, and is different from what other standard development organizations (SDOs) are proposing and can work efficiently without impacting existing radio access network (RAN) or core network (CN) deployment. Further, another need is to eliminate support needed from incumbent vendors. Also, there is a need for a low cost relay node with simple architecture that provides mobility support, out of band configuration, full duplex capability, reusable cell ID, reusable spectrum configuration.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

OBJECTS OF THE INVENTION

An object of the present disclosure is to overcome one or more disadvantages associated with conventional systems and methods for tunneling user equipment (UE) data to packet data network gateway (PGW).

Another object of the present disclosure is to tunnel UE data to PGW without making modifications to eNB, UE, protocol stack and all EPC elements.

Another object of the present disclosure is to provide mobility support, out of band, full duplex and reuse of cell ID/fully transparent and reuse of 3G/2.5G spectrum as backhaul.

Another object of the present disclosure is to provide low cost relay architecture to any existing radio network without support from incumbent vendors.

Another object of the present disclosure is to reduce number and type of components to be utilized for the system.

SUMMARY

The present disclosure relates to the field of radio access network. More particularly, the present disclosure aims to describe a relay architecture, a relay node, and a relay method thereof for enabling ultra-low cost radio access network.

In an aspect, the present disclosure relates to tunneling of a user equipment (UE) messages/signals by creating one or more tunnels so as to prioritize a plurality of control messages over a plurality of data messages, wherein the one or more tunnels can be created when the UE gets connected to a relay node (RN). In an aspect, the one or more tunnels can be used for tunneling one or more Non-Access Stratum (NAS) messages/signals from the UE to a Packet Data Network Gateway (PGW) over at least one of the created tunnels, wherein the one or more NAS messages can be forwarded from the PGW to Mobility Management Entity (MME).

In an aspect, depending on buffer status of NAS messages exchanged between the UE and the RN, the one or more tunnels in the form of evolved packet system (EPS) bearers can be created by the RN to send data at a specific bit rate and quality of service (QoS). In another aspect, tunnels (also interchangeably referred to as or EPS bearers) can carry voice and/or data. In yet another aspect, one of the EPS bearers can be of higher priority than the other EPS bearer.

In an aspect, the RN can perform encapsulation of the NAS messages and the PGW can perform the de-encapsulation. In another aspect, tunnels can also be created between the RN and the PGW.

Embodiments of the present disclosure provide relay architecture, a relay node (RN), and a method thereof to be used in a wireless network. An embodiment of the present disclosure provides a relay architecture where a user equipment (UE) NAS and data traffic over EPS bearer are tunneled all the way to PGW so as to avoid any modification to existing network elements. In this arrangement, only relay node needs to changed, and therefore cost such as of architectural protocol configuration, configuration of other network elements, etc., which impacts existing network, can be avoided. The proposed relay node architecture does not require any change to be made in eNodeB, UE, and other EPC elements, or change to protocol stack.

In an aspect, relay node architecture of the present disclosure does not require much change in the other network elements, and can be deployed without any impact whatso-ever to existing radio access network (RAN) or core network (CN) deployment and without any support from incumbent vendors. RN of present disclosure provides mobility support, out of band configuration, full duplex capability, reusable cell ID, and reusable spectrum configuration.

Embodiments of the present disclosure relate to a relay architecture, a relay node system, and a relay method thereof for low cost radio access network. The relay node architecture can include a separate secure tunnel for NAS/control signal and data traffic. In example implementation, two tunnels such as a first EPS bearer and a second EPS bearer can be created to prioritize control messages over data messages, where the first EPS bearer can be used for control message signaling and the second EPS bearer can be used for data traffic. In an example implementation, the first EPS bearer can be configured with high data rate and high quality of service (QoS) in comparison to that of second EPS bearer. These dedicated EPS bearers can be created whenever UE needs to access voice or data service based on queue status between the UE and the relay node.

In an aspect, the proposed relay node system can include a packet receive module that is configured to receive a data packet from a user equipment (UE), a network queue based priority module configured to classify the packet into either a control packet or a data packet based on queue/buffer status, a control channel forwarding module configured to forward the packet over control bearer/channel if the received packet is a control packet, and a data channel forwarding module configured to forward the packet over the data bearer if the received packet is a data packet.

In an exemplary implementation, eNodeB can be configured to unpack NAS as received from RN and send the NAS to MME. eNodeB can be unaware of the NAS and data traffic from UEs attached with the RN.

In an exemplary implementation, RN can be configured to send, encapsulate, and tunnel NAS message of a UE attached with the RN over the first EPS bearer towards PGW. The PGW then forwards the NAS message as received from the UE to MME or the Internet. In case the NAS message was encapsulated at the RN; the PGW or the HENB GW can de-encapsulate the NAS message before sending it to the MME. In an exemplary implementation, S5/S8 interfaces can be configured in the network to provide connectivity to roaming UEs. RN can be configured to send data traffic towards another PGW over the second EPS bearer.

In another exemplary implementation, different variants of the proposed relay architecture are possible. For example, in one implementation, Home eNodeB Gateway (HeNBGW) can optionally be placed between PGW and MME. In one another implementation, HeNB GW can be configured to decouple control and data traffic, send control/NAS messages towards MME and data traffic towards Internet. In another example implementation, HeNB GW can be used only when there is only one dedicated EPS bearer between relay node RN and PGW. In yet another exemplary implementation, HeNB GW can optionally be replaced with SGW/PGW.

In an exemplary deployment, MIMO links such as N*M MIMO links can be used on backhaul to increase access capacity and throughput. For example, access can be 40 Mbps, backhaul can be 4*10 Mbps due to use of MIMO. In other words, there can be 12 Physical Resource Block (PRBs) on backhaul and 48 PRB on access.

In another exemplary deployment, wireless backhaul can be configured to use spectrum bandwidth different from spectrum band used in access link. For example, backhaul link can be configured over band 40, and access link can be configured over band 33. Arrangement and configuration of different spectrum bandwidth to be used by backhaul and access link enables one operator to roll-out wireless server (for example, TLE service) using a second operator's network. Implementation of relay node and/or architecture of present disclosure enables one operator who provides access link to use backhaul link of another operator. Embodiments of the present disclosure eliminate vendor dependency and allow a new vendor to provide wireless services using the basic infrastructure of existing vendors.

Relay architecture of the present disclosure enables low cost roll out of wireless services in any existing radio access network without support from incumbent vendors. Relay architecture uses 3GPP specification for providing security, handover and billing.

Various objects, features, aspects and advantages of the present disclosure will become more apparent from the following detailed description of preferred embodiments, along with the accompanying drawing figures in which like numerals represent like features.

BRIEF DESCRIPTION OF DRAWINGS

The diagrams are for illustration only, which thus is not a limitation of the present disclosure, and wherein.

DETAILED DESCRIPTION OF THE INVENTION

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Embodiments of the present invention may be provided as a computer program product, which may include a machine-readable storage medium tangibly embodying thereon instructions, which may be used to program a computer (or other electronic devices) toperform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

The present disclosure relates to the field of radio access network. More particularly, the present disclosure aims to describe a relay architecture, a relay node, and a relay method thereof for enabling ultra-low cost radio access network.

In an aspect, the present disclosure relates to tunneling of a user equipment (UE) messages/signals by creating one or more tunnels so as to prioritize a plurality of control messages over a plurality of data messages, wherein the one or more tunnels can be created when the UE gets connected to a relay node (RN). In an aspect, the one or more tunnels can be used for tunneling one or more Non-Access Stratum (NAS) messages/signals from the UE to a Packet Data Network Gateway (PGW) over at least one of the created tunnels, wherein the one or more NAS messages can be forwarded from the PGW to Mobility Management Entity (MME).

In an aspect, depending on buffer status of NAS messages exchanged between the UE and the RN, the one or more tunnels in the form of evolved packet system (EPS) bearers can be created by the RN to send data at a specific bit rate and quality of service (QoS). In another aspect, tunnels (also interchangeably referred to as or EPS bearers) can carry voice and/or data. In yet another aspect, one of the EPS bearers can be of higher priority than the other EPS bearer.

In an aspect, the RN can perform encapsulation of the NAS messages and the PGW can perform the de-encapsulation. In another aspect, tunnels can also be created between the RN and the PGW.

Embodiments of the present disclosure provide relay architecture, a relay node (RN), and a method thereof to be used in a wireless network. An embodiment of the present disclosure provides a relay architecture where a user equipment (UE) NAS and data traffic over EPS bearer are tunneled all the way to PGW so as to avoid any modification to existing network elements. In this arrangement, only relay node needs to be changed, and therefore cost such as of architectural protocol configuration, configuration of other network elements, etc., which impacts existing network, can be avoided. The proposed relay node architecture does not require any change to be made in eNodeB, UE, and other EPC elements, or change to protocol stack.

In an aspect, relay node architecture of the present disclosure does not require much change in the other network elements, and can be deployed without any impact whatsoever to existing radio access network (RAN) or core network (CN) deployment and without any support from incumbent vendors. RN of present disclosure provides mobility support, out of band configuration, full duplex capability, reusable cell ID, and reusable spectrum configuration.

Embodiments of the present disclosure relate to a relay architecture, a relay node system, and a relay method thereof for low cost radio access network. The relay node architecture can include a separate secure tunnel for NAS/control signal and data traffic. In example implementation, two tunnels such as a first EPS bearer and a second EPS bearer can be created to prioritize control messages over data messages, where the first EPS bearer can be used for control message singling and the second EPS bearer can be used for data traffic. In an example implementation, the first EPS bearer can be configured with high data rate and high quality of service (QoS) in comparison to that of second EPS bearer. These dedicated EPS bearers can be created whenever UE needs to access voice or data service based on queue status between the UE and the relay node.

In an aspect, the proposed relay node system can include a packet receive module that is configured to receive a data packet from a user equipment (UE), a network queue based priority module configured to classify the packet into either a control packet or a data packet based on queue/buffer status, a control channel forwarding module configured to forward the packet over control bearer/channel if the received packet is a control packet, and a data channel forwarding module configured to forward the packet over the data bearer if the received packet is a data packet.

In an exemplary implementation, eNodeB can be configured to unpack NAS as received from RN and send the NAS to MME. eNodeB can be unaware of the NAS and data traffic from UEs attached with the RN.

In an exemplary implementation, RN can be configured to send, encapsulate, and tunnel NAS message of a UE attached with the RN over the first EPS bearer towards PGW. The PGW then forwards the NAS message as received from the UE to MME or the Internet. In case the NAS message was encapsulated at the RN; the PGW or the HENB GW can de-encapsulate the NAS message before sending it to the MME. In an exemplary implementation, S5/S8 interfaces can be configured in the network to provide connectivity to roaming UEs. RN can be configured to send data traffic towards another PGW over the second EPS bearer.

In another exemplary implementation, different variants of the proposed relay architecture are possible. For example, in one implementation, Home eNodeB Gateway (HeNB GW) can optionally be placed between PGW and MME. In one another implementation, HeNB GW can be configured to decouple control and data traffic, send control/NAS messages towards MME and data traffic towards Internet. In another example implementation, HeNB GW can be used only when there is only one dedicated EPS bearer between relay node RN and PGW. In yet another exemplary implementation, HeNB GW can optionally be replaced with SGW/PGW.

In an exemplary deployment, MIMO links such as N*M MIMO links can be used on backhaul to increase access capacity and throughput. For example, access can be 40 Mbps, backhaul can be 4*10 Mbps due to use of MIMO. In other words, there can be 12 Physical Resource Block (PRBs) on backhaul and 48 PRB on access.

In another exemplary deployment, wireless backhaul can be configured to use spectrum bandwidth different from spectrum band used in access link. For example, backhaul link can be configured over band 40, and access link can be configured over band 33. Arrangement and configuration of different spectrum bandwidth to be used by backhaul and access link enables one operator to roll-out wireless server (for example, TLE service) using a second operator's network. Implementation of relay node and/or architecture of present disclosure enables one operator who provides access link to use backhaul link of another operator. Embodiments of the present disclosure eliminate vendor dependency and allow a new vendor to provide wireless services using the basic infrastructure of existing vendors.

Relay architecture of the present disclosure enables low cost roll out of wireless services in any existing radio access network without support from incumbent vendors. Relay architecture uses 3GPP specification for providing security, handover and billing.

Different embodiments of the present disclosure provide a relay architecture, a relay node and a method thereof to be used in the wireless network. An embodiment of the present disclosure provides a relay architecture, where a user equipment (UE)non-access stratum (NAS) and data traffic over evolved packet system (EPS) bearer are tunneled all the way to packet data network gateway (PGW), avoiding any modification to existing network elements. In this arrangement, only RN needs to change, and therefore cost such as of architectural protocol configuration, configuration of other network elements, etc., which impacts existing network can be avoided. The proposed RN architecture does not require any change to be made in eNodeB, UE, and other EPC elements, or change to protocol stack.

Figure 2A:
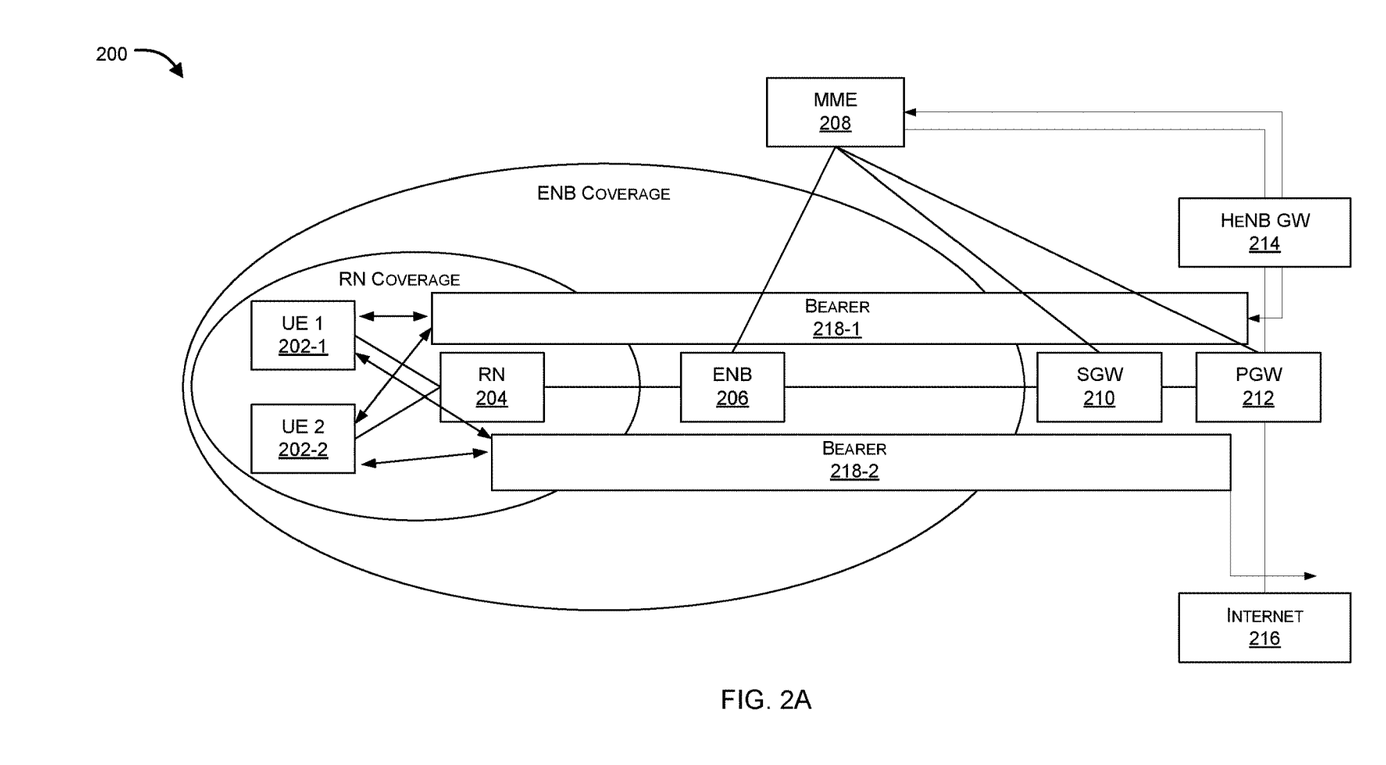
FIGS. 2A to 2C illustrate exemplary relay node architectures for control message signaling and data message transfer in accordance with an embodiment of the present disclosure

FIG. 2A illustrates an exemplary relay node architecture for control message signaling and data message transfer in accordance with an embodiment of the present disclosure. As illustrated, architecture 200 can include two tunnels or evolved packet system (EPS) bearers 218-1 and 218-2 to send/receive data between PGW and any or a combination of user equipment (UE) 1 202-1 and UE 2 202-2. In an aspect, EPS bearer 218-1 can be configured for high data rate transmission and quality of service (QoS) in comparison to that of EPS bearer 218-2. For instance, EPS 218-1 can be used for control message singling, while the other EPS bearer 218-2 can be used for data traffic. These dedicated EPS bearers can be created whenever UE 1 202-1 and/or UE 2 202-2 (collectivity referred to as UEs 202) get attached to a relay node (RN) 204 and requires access to voice or data service. In an exemplary implementation, RN 204 can, based on queue of buffer status exchanged between UEs 202 and relay node RN 204, create one or more bearers 218 of a specific bit rate and QoS.

In an exemplary implementation, an evolved nodeB (eNodeB)/eNB 206 or a serving gateway (SGW) 210 can be configured to unpack non-access stratum (NAS) messages as received from relay node RN 204, and send the NAS to mobility management entity (MME) 208. In another aspect, eNodeB 206 can be unaware of the NAS and data traffic from UEs 202 attached with the relay node RN 204.

In an exemplary implementation, relay node RN 204 can be configured to send, encapsulate, and tunnel NAS message of a UE 202 that is attached with the relay node RN 204, over one of the EPS bearers (say 218-1) towards PGW 212. The packet data network gateway (PGW) 212 can forward the NAS message as received from the UE 202 to MME 208 or to the Internet 216. In case the NAS message was encapsulated at the RN 204, PGW 212 or home eNodeB-gateway (HeNB GW) 214 can de-encapsulate the NAS message before sending it to the MME 208. In another exemplary implementation, S5/S8 interfaces can be configured in the network to provide connectivity to roaming UEs. RN 204 can be configured to send data traffic towards another PGW over the other EPS bearer 218-2.

In another exemplary implementation, HeNB GW 214 can be configured between PGW 212 and MME 208, wherein the HeNB GW 214 can be configured to decouple control and data traffic and send control/NAS messages towards MME 208 and data traffic towards Internet 216. In yet another exemplary implementation, HeNB GW 214 can be used only when there is only one dedicated EPS bearer between the RN 204 and PGW 212. In yet another example implementation, HeNB GW 214 can be replaced with SGW/PGW.

In an another embodiment, any number of UEs, bases stations, eNodeB, SGW, PGW, a core network (CN), a public switched telephone network (PSTN) can be included in the proposed relay architecture to communicate and/or operate in a wireless network and all such arrangements are within the scope of the invention.

In an embodiment, UE 202 can include, but is not limited to, a mobile phone, a mobile subscriber unit, a pager, a wireless sensor, a smart phone, a tablet PC, a PDA, and the like, as would be known to people having ordinary skill in the art.

In an embodiment, one or more data bearers and/or EPS bearers thereof is not limiting the scope of the present disclosure in any manner, and any tunnel mechanism is well within the scope of the present disclosure.

In an aspect, it would be appreciated that the exemplary layout of FIG. 2 is architecturally an eNodeB that is virtually extended and undetectable by eNodeB and EPC elements. So this architecture can be called as virtual eNodeB. For short V-eNodeB. This is similar to macro, micro, pico and femto but the major difference is non-line of sight (wireless) backhaul. Also this is unlike all Relay architectures proposed till date.

In an aspect, as mentioned above, the proposed eNodeB architecture can be referred to as Virtual-eNodeB or V-eNodeB which does not have any change to eNB, UE and all EPC elements, and also does not change Protocol stack. Furthermore, all changes are restricted to Relay Node only. The proposed architecture can also have all required mobility support, and be out of band with full duplex that reuses cell ID/fully transparent and reuses 3G/2.5G spectrum as backhaul.

Figure 2B:
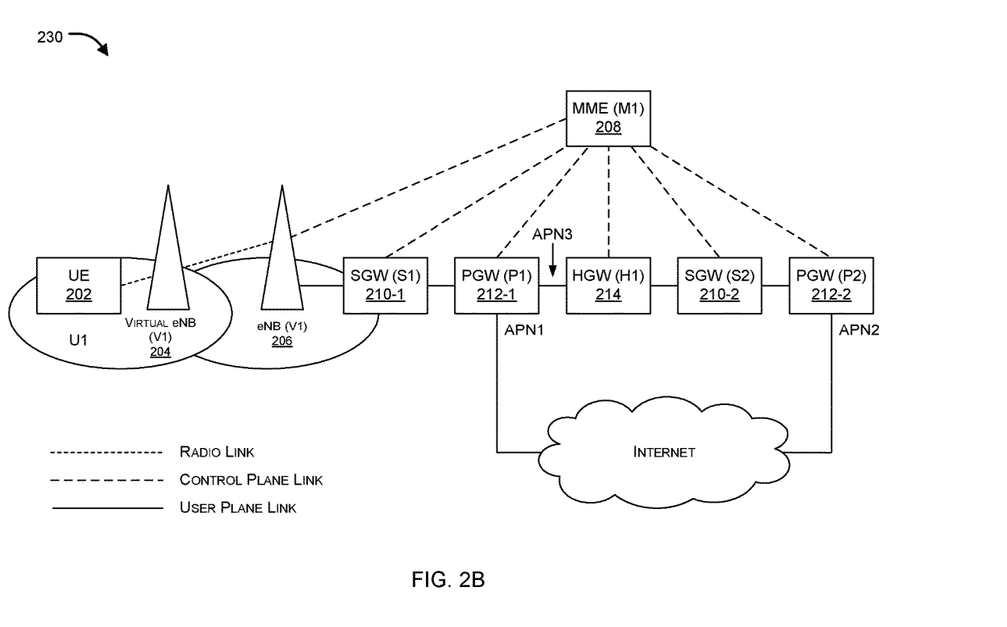

With reference to FIG. 2B, it is to be appreciated that RN 204 is for coverage and not for capacity. We can therefore accept reduction in overall service throughput to bring UEs 202 into coverage, who otherwise would not have been in coverage and consequently increasing revenue by coverage enhancement. In this embodiment, RN 204 is designed to appear and be labeled as a Virtual eNodeB or VeNB or VeNodeB (also referred to as 204) to differentiate from existing relay node specified in 3GPP Specifications. FIG. 2B illustrates message flow have UE (U1) 202, RN or Virtual eNodeB (V1) 204, eNB (E1-In the figure this is shown as V1; please edit the FIG. 206, two SGWs (S1 and S2) 210-1 and 210-2, two PGWs (P1 and P2) 212-1 and 212-2, one HeNB-GW (H1) 214, and one MME (M1) 208. U1 202 is close to V1 204, far away from E1 206. U1 202 is fixed or moves within the coverage of V1 204. There are two scenarios for serving U1: 1) with hard-handover 2) with soft-handover. In this example we cover hard-handover; when U1 202 leaves V1 204 and enters coverage of E1 206, existing EPS bearer is discontinued.

In an exemplary aspect, inactivity timer for V1 204 is configured as infinity at E1 206. This network is under the OAM of mobile operator and therefore this assumption is valid. Below is message flow for mobile originating connection request:

1. U1: RRC connection request is sent to V1
2. V1: RRC connection request is sent to E1. (If inactivity timer is set to infinity, then the ERAB connection will be already available if it was previously established. There are many other methods to continue the ERAB connection and those are obvious to person skilled in the art. It suffices that method to not terminate ERAB connection are out of the scope.)
3. E1: S1-MME(V1) with connection request is sent to M1
4. M1: Create E1-P1 tunnel with guaranteed bit rate to APN3; this APN3 is operator configured for V1, V2, etc. For UEs not connected through V1, APN1 is used. For U1 APN2 is used. APN means Access Point Name as in 3gpp specification.
5. M1: S1-AP(S1-MME(V1)) with connection response for V1
6. E1: Learns S1-AP(S1-MME(V1)) and creates ERAB for V1
7. V1: Encapsulates S1-MME(U1) within data bearer. (It gets tunneled till P1 through E1-P1 bearer as in next step.)
8. E1: S1-UP(S1-MME(U1)) by tunneling with TED of P1
9. P1: De-encapsulates S1-MME(U1) and transmits towards H1
10. H1: Transmits S1-MME(U1) to M1, either directly or via S2. (We are assuming only one MME, for simplicity)
11. M1: Create H1-P2 tunnel with guaranteed bit rate to APN2. As mentioned earlier APN2 is used only for V1, V2, etc.
12. V1: Understands the request for creation of V1-P2 tunnel and establishes a tunnel
13. M1: S1-AP(U1) with connection response via H1, P1-E1 tunnel and V1-E1 ERAB
14. V1: Learns S1-AP response to U1 and creates ERAB for U1
15. U1: Now IP packet is transmitted with APN2
16. V1: Encapsulates the received packet with APN3
17. E1: Tunnels packet received from V1 and sends towards P1
18. P1: De-encapsulates packet with TEID=P1 and sends to APN3.
19. H1: Receives packet with TEID=P2 and forwards to APN2. (If S1-MME(U1) was sent by V1, then H1 will send this packet to M1. Else this is S1-UP(U1) towards APN2.)
20. P2: De-encapsulates S1-UP(U1) packet with TEID=P2 and forwards to internet via APN2.

Mobile or UE terminating call would now be explained. UE2 (U2) under the MME2 (M2) is trying to contact U1 (Both U2 and M2 are not shown in the figure). The serving MME (M1) for U1 can be identified via HLR/VLR/HSS as in 3GPP specifications. Below is the message flow for mobile terminating call:

1. M2: Contacts M1 for LAI/RAI/TAI
2. M1: Knows U1 is in H1 and sends S1-MME(U1-paging) to V1 via H1 (or S2)
3. V1: Pages U1. (If there were many RNs then all of them are paged by H1 (or S2)
4. U1: Follows Mobile Originating flow as described above after reception of the Page.

Hand-over of U1 from V1 to E1 is not of primary concern in coverage scenario when the UEs are primarily fixed and DSL-like broadband connection is required with restricted mobility. However, if HO is needed, then S1-HO can be used. The anchoring of bearers at P1 and/or P2 is also feasible as the IP traffic on APN1 can be also re-directed onto APN3.

The proposed architecture involves two types of PGW and SGW: one of smaller capacity and another of larger capacity. It is possible to reduce the count to one, each, by having back-and-forth flow through same SGW and PGW.

Figure 2C:
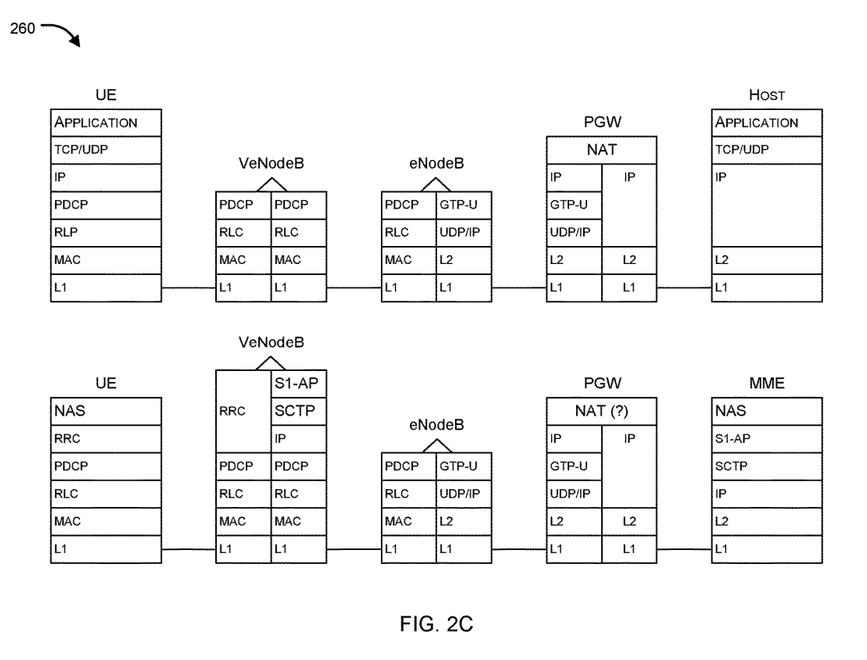

FIG. 2C illustrates yet another embodiment for RN protocol architecture wherein the modification is only performed to the RN stacks. It is different and simpler than 3GPP Relay Node. (The triangle placed on top of the two stacks in every element is a Relay that switches incoming packet from one stack to the other stack. These switching relays have different behavior for different elements.) RN does not need double IP stack for RN. RN is similar to HeNB and HGW with link replaced by combination of ERAB for RN, EPC bearer for RN and the link connecting PGW and HGW. For NAS messages of RN, the stack is same as for UE and therefore will not be covered. The set of protocol stacks given at the top are for tunneling data traffic. The set of protocol stacks given at the bottom are for tunneling control or NAS traffic.

Figure 3A:
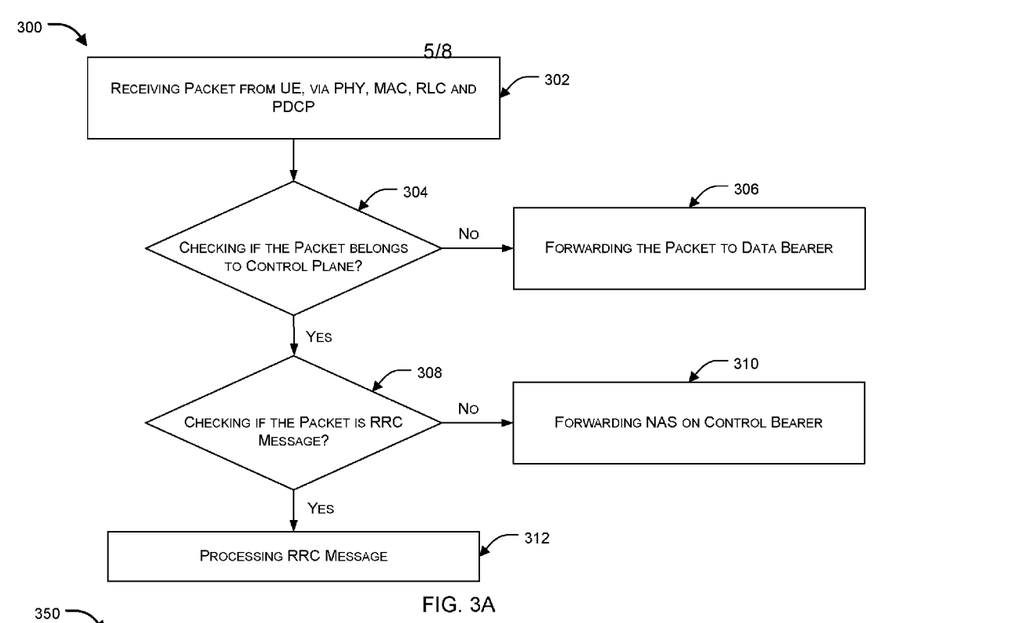
FIG. 3A illustrates an exemplary flow diagram depicting relay processing for a packet received from a UE and forwarding to a network in accordance with an embodiment of the present disclosure.

FIG. 3A illustrates an exemplary flow diagram depicting relay processing for a packet received from a UE and forwarding to a network in accordance with an embodiment of the present disclosure. In an aspect, the proposed method can include the steps of, at step 302, receiving of a packet from a UE 202 via protocol stack, which includes physical layer (PHY), MAC, radio link control (RLC) and packet data convergence protocol (PDCP), and at step 304, checking whether the received packet belongs to control plane, wherein if the received packet does not belong to the control plane, at step 306, forwarding the packet to a data bearer/tunnel.

In case the received packet belongs to control plane, the method can further include the step of, at step 308, checking if the received packet is radio resource control (RRC) message such that if the received packet does not belong to RRC message, at step 310, NAS is forwarded on the control bearer/tunnel else, at step 312, the RRC message is processed.

In an embodiment, radio-specific functionality can be executed by the control plane in both modes of UE, wherein modes can be idle or connected.

In an embodiment, user plane protocol stack sub-layers such as PDCP, RLC and MAC can be utilized between the UE 202 and eNodeB to encapsulate packets, and tunnel the encapsulated packets to PGW from eNodeB.

In another embodiment, any suitable tunneling protocol and/or mechanism such as GPRS Tunneling Protocol (GTP), and the like, can be utilized for tunneling encapsulated packets to PGW from eNodeB.

Figure 3B:
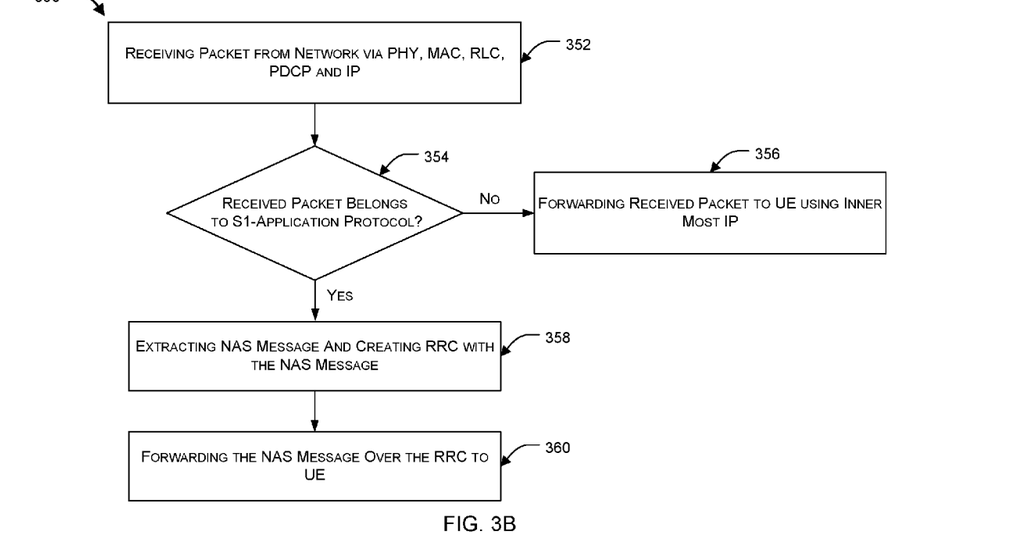
FIG. 3B illustrates an exemplary flow diagram depicting relay processing for a packet received from a network and forwarding to a UE in accordance with an embodiment of the present disclosure

FIG. 3B illustrates an exemplary flow diagram depicting relay processing for a packet received from a network and forwarding to a UE in accordance with an embodiment of the present disclosure. In an aspect, the proposed method can include the steps of, at step 352, receiving a packet from the network via protocol stack, which includes PHY, MAC, RLC and packet data convergence protocol (PDCP), and at step 354, checking if the received packet belongs to S1AP (S1-Application Protocol) such that if the received packet does not belong to S1AP, at step 356, forwarding the received packet data to UE by using inner most IP. On the other hand, in case the received packet belongs to S1AP, the method can, at step 358, extract NAS message and create RRC with the NAS message, and at step 360, forward the NAS over RRC to UE.

Figure 4A:
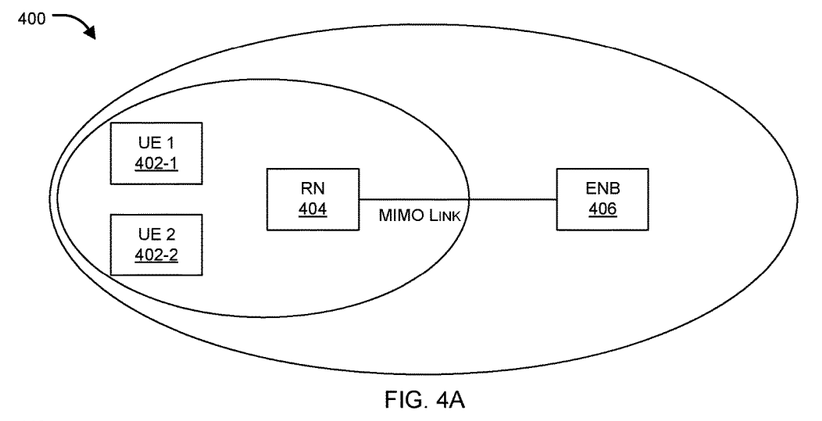
FIG. 4A illustrates an exemplary relay node deployment by using MIMO link between relay node and enodeB/ENB in accordance with an embodiment of the present disclosure

FIG. 4A illustrates an exemplary relay node deployment by using MIMO link between relay node and eNodeB/ENB in accordance with an embodiment of the present disclosure. As shown in FIG. 4A, relay node RN 404 provides connectivity between UEs (UE 1 402-1 and UE 2 402-2) and ENB 406 over multiple-input and multiple-output (MIMO) links, preferably N*M MIMO link. The MIMO link can be used on backhaul to increase access capacity and throughput. For example, access link can be 40 Mbps, backhaul can be 4*10 Mbps due to use of MIMO. In other words, there can be 12 PRBs on backhaul per MIMO link and 48 PRB on access.

In an embodiment, MIMO can include multiple transmit and multiple receive antennas for multipath propagation of data, and multiplies capacity of a radio link to enhance performance.

In an embodiment, backhaul can be utilized to carry packets via MIMO on backhaul between the RN 404 and eNodeB 406.

In an embodiment, any or a combination of UEs, relay nodes, eNodeB, core network, and the like, can be configured to utilize aspects of the present invention, and all such combinations are within the scope of present invention.

In an embodiment, LTE based wireless backhaul bandwidth uses lower number of resource blocks than access links by using N*M MIMO on backhaul.

Figure 4B:
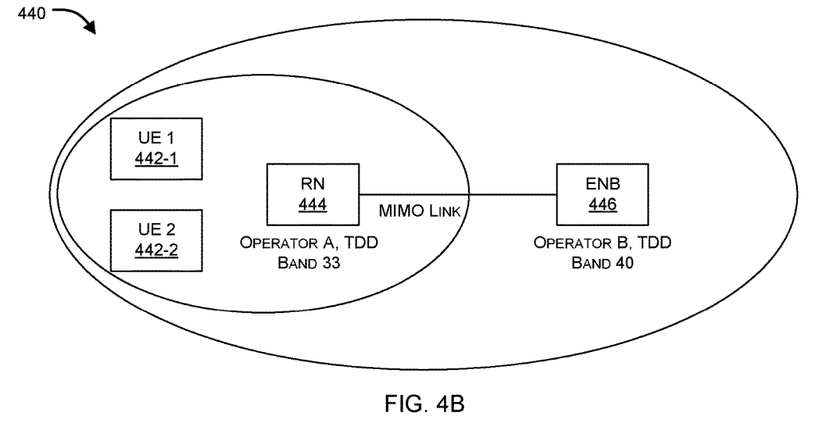
FIG. 4B illustrates another exemplary relay node deployment to roll-out LTE service by using another operator network in accordance with an embodiment of the present disclosure.

FIG. 4B illustrates another exemplary relay node deployment to roll out LTE service by using another operator network in accordance with an embodiment of the present disclosure. In an example deployment, wireless backhaul can be configured to use spectrum bandwidth different from spectrum bandwidth used in the access link. For example, backhaul link can be configured over band 40 and the access link can be configured over band 33. As illustrated in FIG. 4B, RN 444 that connects with UE 1 442-1 and UE 2 442-2 can be configured to operate on band 33 and the enodeB/ENB 446 that connects the backhaul network to the relay node RN 444 at operator A can be configured to use band 40, wherein band 40 is available with operator B. The arrangement and configuration of different spectrum bandwidth to be used by backhaul and the access link enables one operator to roll-out LTE service by using another operator's network.

In an another embodiment, any backhaul mechanism such as free space optics (FSO), point-to-point microwave radio relay transmission, and the like can be used, as known to people having ordinary skill in the art.

In an embodiment, uplink time slot and downlink time slot can be different in the same frequency band.

In an embodiment, band 33 and band 40 are exemplary and any other suitable Band(s) can be utilized for the present invention.

Figure 4C:
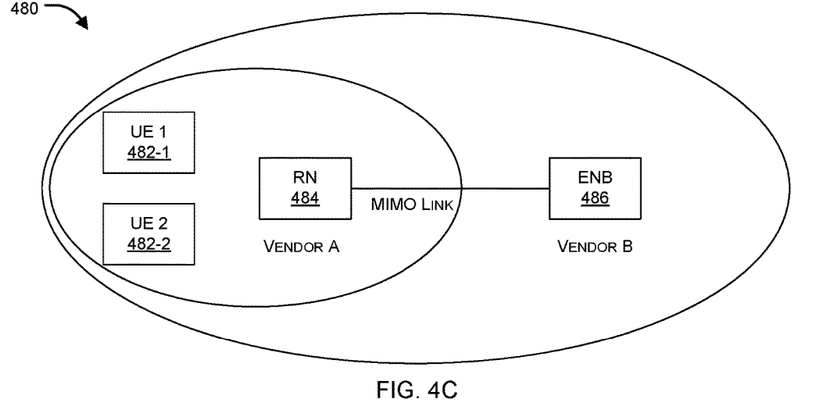
FIG. 4C illustrates an exemplary relay node deployment to roll out LTE service without locking to any vendor in accordance with an embodiment of the present disclosure

FIG. 4C illustrates an exemplary relay node deployment to roll out LTE service without locking to any vendor in accordance with an embodiment of the present disclosure. As shown in FIG. 4C, relay node 484 and UE 1 484-1 and UE 2 482-2 can be from first vendor, e.g. vendor A, and ENB 486 can belong to second vendor, e.g. vendor B. The relay node architecture and relay node of present disclosure therefore provide inter-operability between network equipment of different vendors. Implementation of relay node and/or architecture of present disclosure enables one operator who provides access link to use backhaul link of another operator.

In an embodiment, access link can be served by vendor A and backhaul link can be served by vendor B to roll out LTE service without locking to any vendors.

In an embodiment, the present disclosure eliminates vendor dependency and allows a new vendor to provide wireless services using basic infrastructure of existing vendors.

In an embodiment, any or a combination of vendors, UEs. relay nodes, eNodeB, core network, and the like, can be configured to utilize the aspects of the present invention, and all such combinations are within the scope of present invention.

Figure 5:
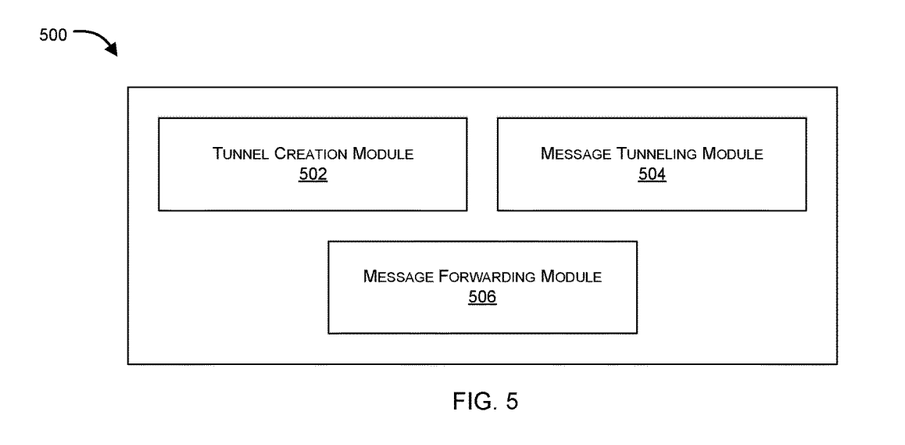
FIG. 5 illustrates exemplary functional modules of relay node system in accordance with an embodiment of the present disclosure.

FIG. 5 illustrates exemplary functional modules of relay node system in accordance with an embodiment of the present disclosure. In an aspect, the proposed relay node system can include a tunnel creation module 502 configured to create one or more tunnels for data traffic transmission, a message tunneling module 504 configured for tunneling NAS message to PGW, and a message forwarding module 506 configured for forwarding the NAS message from PGW to MME.

In an embodiment, the tunnel creation module 502 can be configured to create one or more tunnels (say two tunnels for instance) (dedicated EPS bearers) to prioritize control messages over data messages, wherein out of two tunnels (for instance), one tunnel can be of higher priority with respect to the other tunnel. Higher priority bearer can be implemented as Quality of Service (QoS).

In an embodiment, depending on the queue or buffer status exchanged between UE and RN, the RN can create a bearer/tunnel of a specific bit rate and QoS In an embodiment, message tunneling module 504 can tunnel or encapsulate one or more NAS messages received from UE that is connected to RN to at least one PGW over the created tunnel, wherein the messages can then be forwarded by the PGW to MME. In another embodiment, encapsulation can be performed at RN and de-encapsulation can be performed at the PGW.

In another embodiment, both tunnels/bearers can have different and unique identifiers. In an embodiment, eNodeB can be implemented as an interface to connect RN and PGW. In another embodiment, eNodeB can unpack one or more NAS messages received from the RN and send the messages to MME.

In an embodiment, S5/S8 interfaces can be configured for one or more roaming UEs.

In an embodiment, message forwarding nodule 506 can be configured to forward NAS message(es) received at PGW to MME and/or Internet. In an embodiment, one or more channels can be utilized to connect and forward NAS messages from PGW to MME and/or Internet.

In another embodiment, HeNB GW can be configured between PGW and MME to decouple control and data traffic and send control/NAS messages towards MME and data traffic towards Internet. Further, HeNB GW can be used when there is only one dedicated EPS bearer between RN and PGW. In an alternate embodiment, any gateway such as, SGW, PGW, and the like can be utilized instead of configuring HeNB GW.

Figure 6:
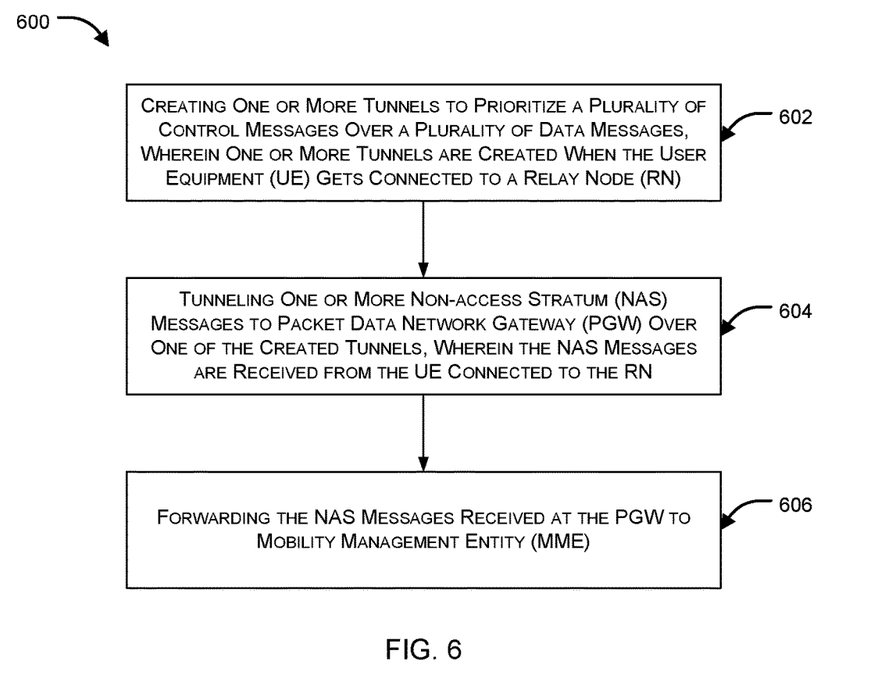
FIG. 6 illustrates an exemplary flow diagram depicting steps involved in sending UE data to PGW in accordance with an embodiment of the present disclosure

FIG. 6 illustrates an exemplary flow diagram 600 depicting steps involved in sending UE data to PGW in accordance with an embodiment of the present disclosure. In an aspect, the proposed method can include the steps of, at step 602, creating one or more tunnels to prioritize a plurality of control messages over a plurality of data messages, wherein one or more tunnels are created when the UE gets connected to a relay node (RN), and at step 604, tunneling one or more non-access stratum (NAS) messages to packet data network gateway (PGW) over one of the created tunnels, wherein the NAS messages are received from the UE that is connected to the RN. Method 600 can further include, at step 606, forwarding the NAS message received at PGW to mobility management entity (MME).

In an aspect, relay architecture of the present disclosure enables low cost roll out of wireless services, in any existing radio access network without support from the incumbent vendors. The proposed relay architecture uses 3GPP specification for providing security, handover, and billing.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Advantages of the Invention

The present disclosure overcomes one or more disadvantages associated with conventional systems and methods for tunneling user equipment (UE) data to PGW.

The present disclosure tunnels UE data to PGW without making modifications in eNB, UE, protocol stack and all EPC elements.

The present disclosure provides mobility support, out of band, full duplex and reuse of cell ID/fully transparent and reuse of 3G/2.5G spectrum as backhaul.

The present disclosure provides low cost relay architecture to any existing radio networks without support from incumbent vendors.

The present disclosure reduces number and type of components to be utilized for the system.

I claim:

1. A relay node (RN) operatively coupled with two or more user equipments (UEs), wherein the RN is configured to create one or more tunnels when the two or more UEs gets attached to the RN so as to enable transmission of data messages and control messages from the two or more UEs directly to a packet data network gateway (PGW), said one or more tunnels being configured from said RN to said PGW, and wherein the one or more tunnels comprise a first tunnel having a higher priority or a higher Quality of Service (QoS) and is configured to transmit the control messages of the two or more UEs, and a second tunnel of lower priority configured to transmit the data messages, said one or more tunnels being created by said RN based on buffer status of one or more Non-Access Stratum (NAS) messages exchanged between said RN and said two or more UEs, wherein a plurality of UEs from said two or more UEs share the first tunnel for transmitting said control messages.

2. The relay node of claim 1, wherein said RN performs encapsulation of the one or more NAS messages, and wherein de-encapsulation of said encapsulated messages is performed by said PGW.

3. The relay node of claim 1, wherein the PGW, upon receipt of the data messages and the control messages transmitted from the two or more UEs, forwards the received data messages to Internet, and forwards the received control messages to a mobility management entity (MME).

4. The relay node of claim 1, wherein the one or more tunnels are created as EPC bearers.

5. The relay node of claim 1, wherein the one or more tunnels are created when the two or more UEs gets attached to the RN to access a voice service or a data service.

6. The relay node of claim 1, wherein the control messages comprise the one or more non-access stratum (NAS) messages.

7. A system comprising:
two or more user equipments (UEs);
a relay node (RN) operatively coupled with the two or more UEs; and
a packet data network gateway (PGW) operatively coupled with the RN, wherein the RN is configured to create one or more tunnels, when the two or more UEs gets attached to the RN, so as to enable transmission of data messages and control messages from the two or more UEs directly to the PGW, said one or more tunnels being configured from said RN to said PGW, and wherein the one or more tunnels comprises a first tunnel, having a higher priority or a higher Quality of Service (QoS), configured to transmit the control messages, and a second tunnel configured to transmit the data messages, said one or more tunnels being created by said RN based on buffer status of one or more Non-Access Stratum (NAS) messages exchanged between said RN and said two or more UEs, wherein a plurality of UEs from said two or more UEs share the first tunnel for transmitting said control messages.

8. The system of claim 7, wherein user plane stack of the RN comprises any or a combination of PDCP, RLC, MAC, and L1 layers, and wherein the control plane stack of the RN comprises any or a combination of RRC, PDCP, RLC, MAC, SCTP, S1-AP, IP and L1 layers.

9. The system of claim 7, wherein the PGW, upon receipt of the data messages and the control messages transmitted from the two or more UEs, forwards the received data messages or the received control messages to a mobility management entity (MME) or to Internet.

10. The system of claim 7, wherein a Home eNodeB Gateway (HeNB GW) is configured between the eNB or PGW and a mobility management entity (MME), wherein the HeNB GW decouples the control messages from the data messages, and sends the control messages towards the MME and the data messages towards the Internet.

11. The system of claim 7, wherein the system comprises a Serving Gateway (SGW) configured between the RN and the PGW so as to receive and forward the control messages towards the MME.

12. The system of claim 7, wherein the system further comprises an eNodeB that is operatively coupled with the RN and is configured to receive the control messages from the RN and forward the control messages to a mobility management entity (MME).

13. The system of claim 7, wherein the RN encapsulates and tunnels the control messages over at least one of the one or more tunnels to the PGW, wherein the PGW, upon receipt of the control messages transmitted from the RN, then de-encapsulates the received control messages.

14. The system of claim 7, wherein S5/S8 interfaces are configured when the two or more UEs is a roaming UE.

15. The system of claim 7, wherein the RN encapsulates and tunnels the control messages over at least one of the one or more tunnels to the HGW, wherein the HGW, upon receipt of the control messages transmitted from the RN, then de-encapsulates the received control messages and forwards to a mobility management entity (MME).

16. A method comprising the steps of:
creating, through a relay node (RN), one or more tunnels to prioritize a plurality of control messages over a plurality of data messages, wherein the one or more tunnels are created when two or more user equipments (UEs) gets attached to the RN, said one or more tunnels being created by said RN based on buffer status of one or more Non-Access Stratum (NAS) messages exchanged between said RN and said two or more UEs, said one or more tunnels being configured from said RN to said PGW;

tunnelling one or more non-access stratum (NAS) messages to packet data network gateway (PGW) over at least one of the created tunnels, wherein the one or more NAS messages are received from the two or more UEs connected to the RN; and forwarding the one or more NAS messages received at the PGW to a mobility management entity (MME).

17. The method of claim 16, wherein, depending on buffer status of the one or more NAS messages exchanged between the two or more UEs and the RN, the at least one of the created tunnels sends the one or more NAS messages at specific bit rate and quality of service (QoS).

18. The method of claim 16, wherein a first tunnel of the one or more tunnels is used for sending the one or more NAS messages, and a second tunnel of the one or more tunnels is used for sending data messages, wherein the first tunnel has higher priority over the second tunnel.

19. The method of claim 16, wherein a second set of tunnels is created between the RN and the PGW.

20. The relay node of claim 1, wherein the control messages are transmitted through the first tunnel from the two or more UEs to the PGW such that the eNodeB is unaware of the control messages being transmitted through the first tunnel by the RN.

* * * * *